(12) United States Patent
Larsson et al.

(10) Patent No.: US 9,665,080 B2
(45) Date of Patent: May 30, 2017

(54) METHOD FOR COMMUNICATING DATA BETWEEN A CONTROL SYSTEM OF A POWER TOOL AND A COMPUTING DEVICE

(75) Inventors: Mikael Larsson, Jönköping (SE); Björn Lundblad, Jönköping (SE); Johan Assargård, Jönköping (SE); Henrik Eklund, Tenhult (SE)

(73) Assignee: HUSQVARNA AB, Huskvarna (SE)

(*) Notice: Subject to any disclaimer, the term of this patent is extended or adjusted under 35 U.S.C. 154(b) by 9 days.

(21) Appl. No.: 14/366,038

(22) PCT Filed: Mar. 21, 2012

(86) PCT No.: PCT/SE2012/050314
§ 371 (c)(1),
(2), (4) Date: Jun. 17, 2014

(87) PCT Pub. No.: WO2013/141767
PCT Pub. Date: Sep. 26, 2013

(65) Prior Publication Data
US 2014/0324194 A1 Oct. 30, 2014

(51) Int. Cl.
*G05B 15/02* (2006.01)
*H04L 12/12* (2006.01)
*H04L 12/40* (2006.01)

(52) U.S. Cl.
CPC ............ *G05B 15/02* (2013.01); *H04L 12/12* (2013.01); *H04L 12/40013* (2013.01);
(Continued)

(58) Field of Classification Search
None
See application file for complete search history.

(56) References Cited

U.S. PATENT DOCUMENTS 4,825,362 A 4/1989 Minami et al.
5,132,905 A 7/1992 Takai et al.
(Continued)

FOREIGN PATENT DOCUMENTS

EP 2339778 A1 6/2011
WO 2006136505 A1 12/2006
(Continued)

OTHER PUBLICATIONS

International Search Report and Written Opinion of International patent application No. PCT/SE2012/050314 mailed Mar. 19, 2013, all enclosed pages cited.
(Continued)

*Primary Examiner* — Daniell L Negron
(74) *Attorney, Agent, or Firm* — Nelson Mullins Riley & Scarborough LLP (57) ABSTRACT

Arrangement and methods for communicating data between a control system (100) of a power tool (10) and a computing device (20). The arrangement (1) comprises a control system (100) with a plurality of electronic control units, ECUs (110, 120), a computing device (20), and a connecting unit (30) comprising a data connection (32). The plurality of ECUs (110, 120) are connected to a common bus of the control system (100). Each of the plurality of ECUs (110, 120) has a passive service mode (201) and an active service mode (202). The computing device is operable of transmitting a wake-up communication signal to the plurality of ECUs (110, 120), which wake-up communication signal comprises an ID of a selected ECU (110, 120) out of the plurality of ECUs (110, 120). The selected ECU (110, 120) is operable to switch from the passive service mode (201) to the active service mode (202) as a response to detecting its ID in the wake-up communication signal, so as to allow communica-
(Continued)

tion of data between the selected ECU (110, 120) and the computing device (20) via the data connection.

11 Claims, 4 Drawing Sheets

(52) U.S. Cl.
CPC ..... *H04L 12/40039* (2013.01); *H04L 2012/4026* (2013.01); *Y02B 60/34* (2013.01)

(56) References Cited

U.S. PATENT DOCUMENTS

| 5,351,778 | A | 10/1994 | Shigemi et al. |
| 5,486,817 | A | 1/1996 | Ina |
| 5,659,702 | A | 8/1997 | Hashimoto et al. |
| 6,484,082 | B1 | 11/2002 | Millsap et al. |
| 7,346,406 | B2 | 3/2008 | Brotto et al. |
| 7,809,495 | B2 | 10/2010 | Leufen |
| 2004/0119517 | A1 | 6/2004 | Pauletti et al. |
| 2006/0101109 | A1 | 5/2006 | Nishio |
| 2006/0168378 | A1 | 7/2006 | Muth |
| 2009/0172163 | A1* | 7/2009 | Carroll ............... H04L 12/12 709/226 |
| 2009/0254203 | A1* | 10/2009 | Gerold ................. B25C 1/08 700/87 |
| 2012/0051241 | A1 | 3/2012 | Mori et al. |
| 2012/0166847 | A1* | 6/2012 | Noda ............... H01M 10/482 713/323 |

FOREIGN PATENT DOCUMENTS

| WO | 2009029684 | A1 | 3/2009 |
| WO | 2010074488 | A2 | 7/2010 |

OTHER PUBLICATIONS

Chapter I International Preliminary Report On Patentability of International patent application No. PCT/SE2012/050314 issued Sep. 23, 2014, all enclosed pages cited.

* cited by examiner

METHOD FOR COMMUNICATING DATA BETWEEN A CONTROL SYSTEM OF A POWER TOOL AND A COMPUTING DEVICE

TECHNICAL FIELD

Embodiments herein deal with arrangements and methods for communicating data between a control system of a power tool and a computing device. In addition, the invention relates to a power tool and a service tool assembly for connecting to the power tool.

BACKGROUND

Power tools may be provided with control systems comprising an electric control unit, ECU. A power tool comprising an ECU may be connected to an external computing device, so as to enable communication of data between the ECU and the computing device. In this way it is possible to change the characteristics of the ECU and/or to perform diagnostics of the ECU.

SUMMARY

It is an object for embodiments herein to provide an improved arrangement and method for communicating data between a control system of a power tool and an external computing device. The method and arrangement should provide a possibility to communicate with power tool control systems comprising more than one ECU, also if there is a limitation of how much power that can be supplied from the computing device. The arrangement and method should be simple, robust and cost-efficient.

According to a first aspect of the solution, the object is at least partially achieved by means of an arrangement for communicating data between a control system of a power tool and a computing device, which arrangement comprises a control system of the power tool, the control system comprising a plurality of electronic control units, ECUs, a computing device provided externally of the power tool, and a connecting unit interconnecting the computing device and the control system, the connecting unit comprising a data connection. The plurality of ECUs is connected to a common bus of the control system. Each of the plurality of ECUs has a passive service mode and an active service mode, wherein the allowed power consumption is significantly lower in the passive service mode than in the active service mode. The computing device is operable of transmitting a wake-up communication signal to the plurality of ECUs when each of the plurality of ECUs is in the passive service mode. The wake-up communication signal comprises an ID of a selected ECU, out of the plurality of ECUs. The selected ECU is operable to switch from the passive service mode to the active service mode as a response to detecting its ID in the wake-up communication signal, so as to allow communication of data between the selected ECU, and the computing device via the data connection.

Since each of the ECUs has a passive service mode in which the ECU consumes a low amount of energy, and an active service mode in which communication with the computing device is allowed, and since the computing device is operable to select one of the plurality of ECUs, forcing that ECU to enter the active service mode, an arrangement is achieved in which the computing device can communicate with one ECU at a time. Due to the simple solution the arrangement can be achieved using cost-efficient and robust components.

According to an embodiment of the first aspect, each of the plurality of ECUs has a transitional start-up mode. The computing device is operable to trigger each of the plurality of ECUs, to switch from the transitional startup mode to the passive service mode by means of transmitting a passive service mode initiating signal via the data connection.

Thereby a simple way of providing a selection between a service mode and an operating mode is made possible during startup of the power tool.

According to an embodiment of the first aspect, the power tool lacks internal power supply when the power tool is in a non-operating mode. According to an embodiment of the first aspect, the connecting unit comprises a voltage supply connection. The computing device is operable to supply power to the plurality of ECUs, via the voltage supply connection when the power tool is in a non-operating mode.

Thereby, a simple way of providing power to the ECUs during a service session is achieved.

According to an embodiment of the first aspect, each of the plurality of ECUs has an operating mode, and the plurality of ECUs, are configured to switch from the transitional start-up mode to the operating mode in the absence of the passive service mode initiating signal.

Thereby, a simple and cost-efficient mode selection procedure may be achieved.

According to a second aspect of the solution, the object is at least partially achieved by means of an arrangement for communicating data between a control system of a power tool and a computing device, which arrangement comprises a control system of the power tool, the control system comprising at least one electronic control unit ECU, a computing device provided externally of the power tool, and a connecting unit interconnecting the computing device and the control system. The connecting unit comprises a data connection. The at least one ECU has a passive service mode and an active service mode, wherein an allowed power consumption is significantly lower in the passive service mode than in the active service mode. The computing device is operable of transmitting a wake-up communication signal to the at least one ECU when the at least one ECU is in the passive service mode, which wake-up communication signal comprises an ID of a selected ECU out of the at least one ECU. The selected ECU is operable to switch from the passive service mode to the active service mode as a response to detecting its ID in the wake-up communication signal, so as to allow communication of data between the selected ECU and the computing device via the data connection.

Since the at least one ECU has a passive service mode in which the ECU consumes a low amount of energy, and an active service mode in which communication with the computing device is allowed, and since the computing device is operable to select one ECU, forcing that ECU to enter the active service mode, an arrangement is achieved which is prepared for adding more ECUs while maintaining the possibility for the computing device to communicate with one ECU at a time. Due to the simple solution the arrangement can be achieved using cost-efficient and robust components. Furthermore, arrangements according to the second aspect enable use of the same service box and computing device for power tools having one ECU as for power tools having several ECUs.

According to an embodiment of the second aspect the at least one ECU has a transitional start-up mode. The computing device is operable to trigger the at least one ECU, to switch from the transitional startup mode to the passive service mode by means of transmitting a passive service mode initiating signal via the data connection.

Thereby a simple way of providing a selection between a service mode and an operating mode is made possible during startup of the power tool.

According to an embodiment of the second aspect, the power tool lacks internal power supply when the power tool is in a non-operating mode. According to an embodiment of the second aspect, the connecting unit comprises a voltage supply connection. The computing device is operable to supply power to the at least one ECU, via the voltage supply connection when the power tool is in a non-operating mode.

Thereby, a simple way of providing power to the ECU during a service session is achieved.

According to an embodiment of the second aspect, the at least one ECU has an operating mode, and the at least one ECU is configured to switch from the transitional start-up mode to the operating mode in the absence of the passive service mode initiating signal.

Thereby, a simple and cost-efficient mode selection procedure may be achieved.

According to a third aspect of the solution, the object is at least partially achieved by means of a method for communicating data between a control system of a power tool and a computing device provided externally of the power tool. The power tool is provided with an internal combustion engine and the power tool lacks internal power supply when the combustion engine is in a non-operating mode. The control system comprises a plurality of electronic control units ECUs, wherein the plurality of ECUs are connected to a common bus of the control system, and wherein each of the plurality of ECUs, has a passive service mode and an active service mode, wherein an allowed power consumption is significantly lower in the passive service mode than in the active service mode. The method comprises the steps of
transmitting a wake-up communication signal from the computing device to the plurality of ECUs when each of the plurality of ECUs is in the passive service mode, wherein the wake-up communication signal comprises an ID of a selected ECU out of the plurality of ECUs,
in the selected ECU switching to the active service mode as a response to detection of the ID in the wake-up communication signal,
communicating data between the selected ECU and the computing device.

According to a fourth aspect of the solution, the object is at least partially achieved by means of a method for communicating data between a control system of a power tool and a computing device provided externally of the power tool, wherein the power tool is provided with an internal combustion engine and wherein the power tool lacks internal power supply when the combustion engine is in a non-operating mode. The control system comprises at least one electronic control unit ECU. The at least one ECU has a passive service mode and an active service mode. An allowed power consumption is significantly lower in the passive service mode than in the active service mode. The method comprises the steps of
transmitting a wake-up communication signal from the computing device to the at least one ECU when each of the at least one ECU is in the passive service mode, wherein the wake-up communication signal comprises an ID of a selected ECU out of the at least one ECU,
in the selected ECU, switching to the active service mode as a response to detection of the ID in the wake-up communication signal,
communicating data between the selected ECU and the computing device.

The advantages and benefits of the third and fourth aspect of the solution, and of embodiments thereof correspond to the advantages and benefits of the first and second aspects of the solutions and of the embodiments thereof.

It is a further object of the invention to provide a power tool having a connecting point connectable to a service tool assembly, which connecting point is less affected by the various conditions in which the power tool is operated.

According to an aspect of the invention this object is achieved with a power tool comprising a driving means for driving a tool of said power tool, an ECU for controlling the driving means, a stop button switch for stopping said driving means, a cable arrangement for connecting the stop button switch and the ECU, the cable arrangement comprising a power tool connector and a stop button connector configured to mate with each other, and when the connectors being connected the stop button switch is connected to the ECU, and when disconnected the stop button switch is disconnected from the ECU, wherein the power tool connector being connectable with a service tool connector of a service tool assembly when disconnected from the stop button connector so as to enable data communication between the ECU and a computing device of the service tool assembly.

The power tool connector is thus physically connected to the stop button connector during normal operation of the power tool, which means that the power tool connector is protected from e.g. dust, dirt or moisture no matter what conditions the power tool is operated in. This is especially advantageous for power tools such as power cutters, chainsaws or e.g. grinding machines, etc, which may be operated under dusty and/or wet conditions. If not protected, the power tool connector would have to be cleaned or even replaced more often. Further, this is a cost-efficient way of protecting the connecting point.

Preferably, the ECU is configured to detect connecting of the power tool connector to the service tool assembly, or more specifically, when the power tool connector is connected to a service tool connector of the service tool assembly. Preferably, such connection is detected when the ECU receives a signal from the computing device through said connection, and the ECU is preferably configured not to permit running of the driving means after having received said signal, which signal is preferably the passive service mode initiating signal.

It is yet a further object to provide the service tool assembly for connecting to said connecting point of the power tool.

BRIEF DESCRIPTION OF THE DRAWINGS

Embodiments herein will be understood and appreciated more fully from the following detailed description, taken in conjunction with the drawings, in which.

DESCRIPTION OF PREFERRED EMBODIMENTS

Figure 1:
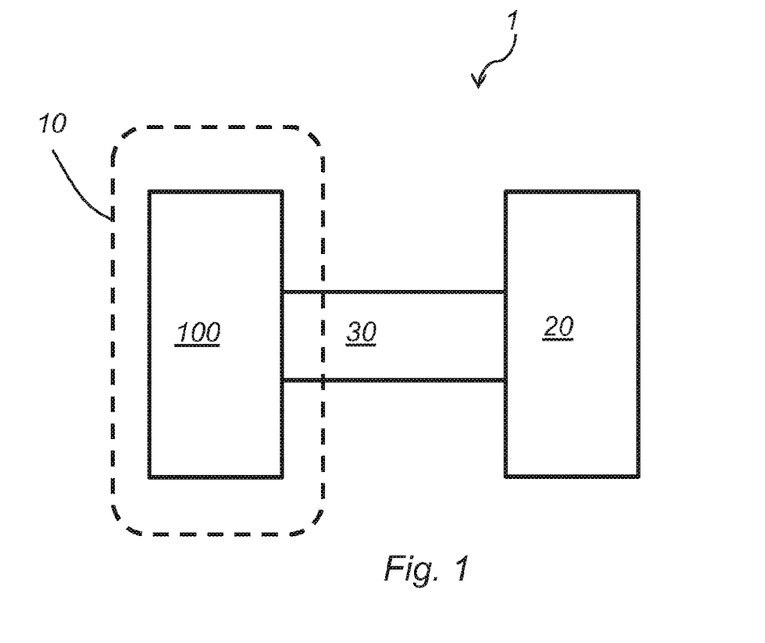
FIG. 1 is a schematic view of an arrangement for communicating data between a control system of a power tool and an external computing device

In FIG. 1, an arrangement for communicating data between a control system of a power tool 10 and a computing device is schematically shown.

The power tool 10 may be a handheld portable power tool 10. As an example, the power tool may be a chain saw 10.

The power tool 10 comprises a control system 100. The control system 100 may be arranged to control operation of a driving means of the power tool 10. According to some embodiments the driving means is an internal combustion engine.

The control system 100 of the power tool 10 may be connected to an external computing device 20 by means of a connecting unit 30. The external computing device may e.g. be a PC or any other kind of suitable computing device.

According to embodiments herein, the control system 100 comprises a plurality of electronic control units ECUs 110, 120.

Figure 2:
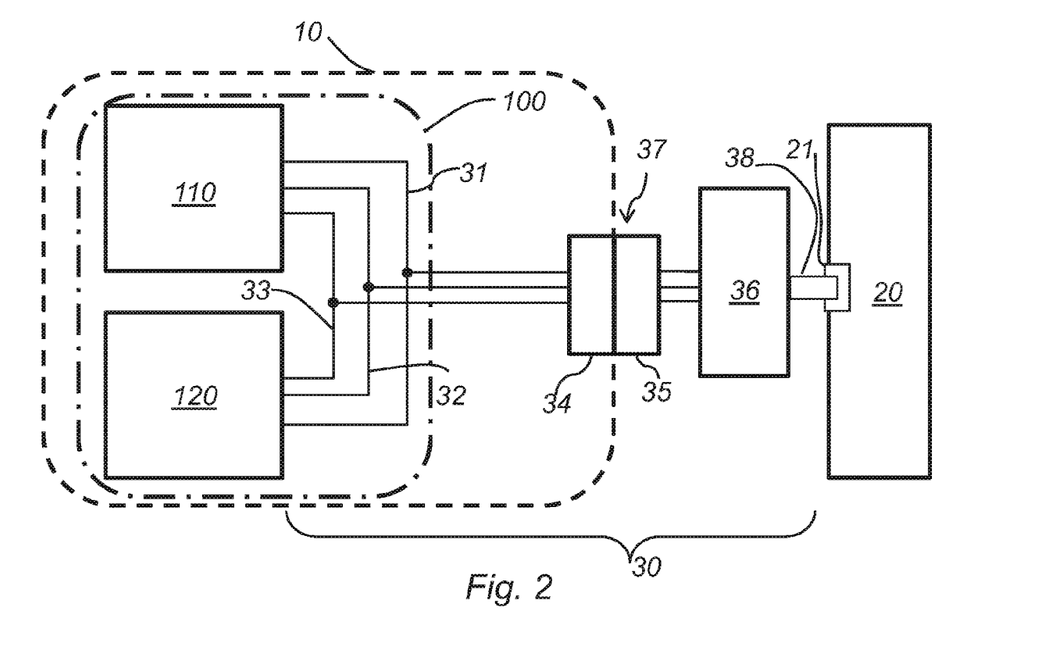
FIG. 2 is a schematic view of the arrangement of FIG. 1, in which the control system and the connecting unit interconnecting the computing device and the control system are shown in more detail.

In FIG. 2 an exemplary control system 100 is schematically shown.

In the embodiment shown in FIG. 2, the control system comprises two electronic control units ECUs 110, 120.

Figure 4:
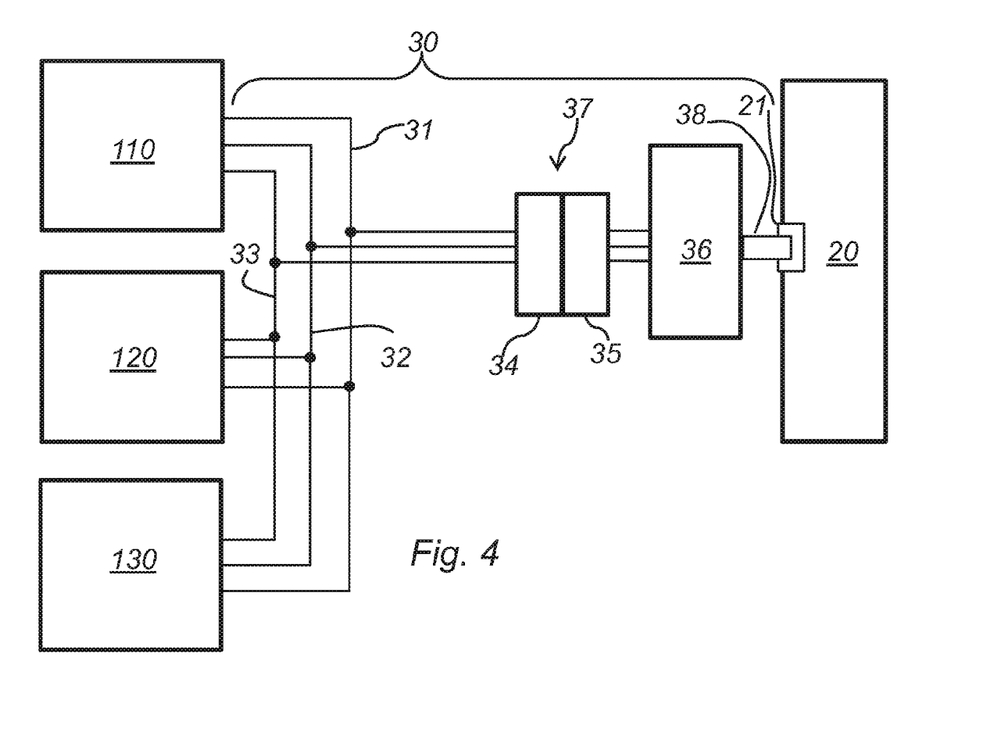
FIG. 4 is a schematic view according to FIG. 1, showing an alternative control system configuration.

The control system 100 may also comprise more than two ECUs. An exemplary embodiment, in which the control system comprises three ECUs 110, 120, 130, is shown in FIG. 4.

According to some embodiments, the control system comprises an ECU 110, 120 in the form of an electronic carburetor control unit 110,120.

According to some embodiments, the control system comprises an ECU in the form of a combustion engine ignition control unit 110, 120.

According to an exemplary embodiment, the power tool 10 is a chain saw 10 driven by an internal combustion engine. The chain saw 10 has a control system 100 comprising a first ECU 110 embodied as an electronic carburetor control unit 110, and a second ECU 120 embodied as a combustion engine ignition control unit 120.

According to embodiments herein, the ECUs are provided on a common communication bus for enabling communication between the ECUs and between the ECUs and other units.

The ECUs may be interconnected by means of signaling wire 32, defining a data connection 32. The data connection 32 is also part of the connecting unit 30 interconnecting the ECUs and components exterior of the control system 100, such as the connector 37 and the service box 36. Thereby, the ECUs are provided on a common bus of the control system.

The ECUs may also be interconnected by means of a voltage supply connection 31. The ECUs may also be interconnected by means of a ground connection 33. The voltage supply connection 31 may also be part of the connecting unit 30. The ground connection 33 may also be part of the connecting unit 30.

The connecting unit 30 is arranged to interconnect the ECUs of the control system and the computing device 20.

The connecting unit may comprise a connector 37 in which a power tool connector part 34 is connectable to a service tool connector part 35. The power tool connector part 34 is connected to the ECUs of the control system by means of the data connection 32. The power tool connector part may also be connected to the ECUs of the control system by means of the voltage supply connection 31. The power tool connector part may also be connected to the ECUs of the control system by means of the ground connection 33.

The service tool connector part 35 is connected to a service box 36 in which signals to/from an ECU are adapted from/to a communication protocol that can be understood by the computing device 20. According to an exemplary embodiment, the service box 36 is connectable to a USB port 21 of the computing device 20, by means of a USB cable 38.

The ECUs of the power tool control system 100 are connected to the computing device when the service box is connected to the computing device and the two parts 34, 35 of the connector 37 are connected.

Then, it may be possible to perform service related actions. Examples of such service related actions include monitoring the status of an ECU in the control system, download new software to the ECU, ask for and receive data from an ECU, transmit data to the ECU etc.

Conveniently, the external parts such as the computing device 20, the service box 36, the service tool connector part 35 and wiring therebetween are referred to as a service tool assembly. Thus, by connecting the connector parts 34, 35, a data communication between the computing device 20 of the service tool assembly and an ECU 110, 120 of the power tool may be established.

Figure 8:
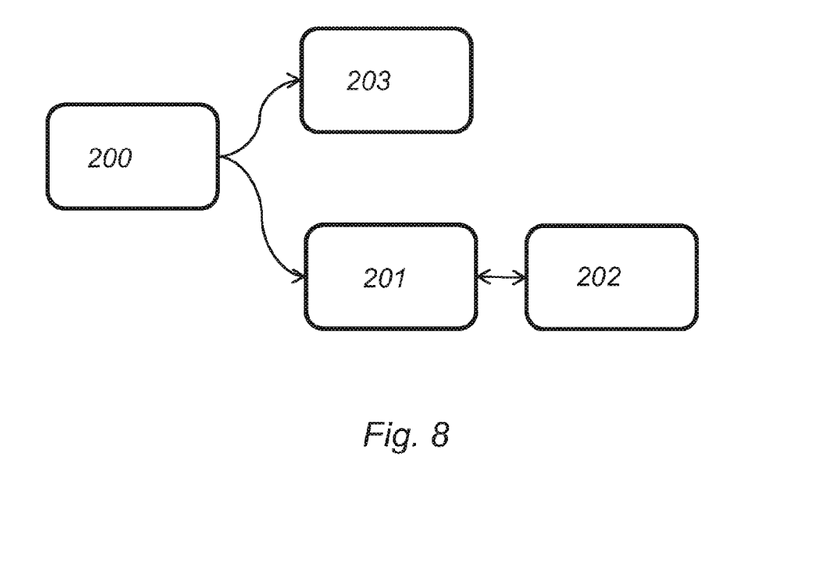
FIG. 8 is a schematic view showing the modes of the electronic control units ECUs of a control system according to embodiments herein.

According to embodiments herein, each of the ECUs has a transitional startup mode 200, an operating mode 203, a passive service mode 201, and an active service mode 202.

An ECU is in the operating mode during operation of the power tool. The passive service mode 201 and the active service mode 202 are non-operating modes.

According to some embodiments, the power tool lacks internal voltage supply when the power tool is in a non-operating mode. When the ECUs of the control system are in non-operating modes the power tool is in a non-operating mode. In that case, power may be supplied to the ECUs from the computing device via the connecting unit 30 when the power tool is in a non-operating mode.

In the following an exemplary course of events is described.

When the power tool 10 is connected to the computing device, the service box 36 may sense a capacitive load on the voltage supply connection 31. Then, the computing device will start supplying power to the ECUs 110, 120 via the voltage supply connection 31. One of the ECUs may receive power from the computing device, via another ECU.

A powered off ECU will enter a transitional startup mode 200 as soon as voltage is supplied to it.

An ECU entering the transitional startup mode 200 may not know whether power is supplied from a power source within the power tool or from an external power source, such as the computing device.

According to some embodiments herein power may be supplied to the ECUs of the control system from the computing device when the computing device is connected to the control system via the connecting unit 30.

From the transitional startup mode, the ECUs may transfer to either the operating mode 203 or the passive service mode 201.

The computing device may trigger an ECU to switch from the transitional startup mode to the passive service mode by means of transmitting a passive service mode initiating signal via the data connection 32. All ECUs in the control system will receive the passive service mode initiating signal. The passive service mode initiating signal may e.g. be achieved by means of setting the level of the data connection 32 to "high".

The ECUs may be configured to switch to the passive service mode upon detection of the passive service mode initiating signal.

The ECUs may be configured to leave the transitional startup mode when a predetermined time limit is reached, even if they have received no signal instructing them which mode they should enter. In that case, the ECUs will switch to the operating mode if no service mode initiating signal is received within the predetermined time limit. This means that no service interface is connected and that power comes from another source, internal or external.

Once an ECU has entered the operating mode, it may only switch to a non-operating mode after a reset of the power tool. Correspondingly, once an ECU has entered the passive service mode it may only switch to the operating mode after a reset of the power tool.

All ECUs of a control system comprising a plurality of ECUs may stay in the passive service mode at the same time without overloading a power supply connection from the computing device. As an example, the amount of power which can be supplied from a USB port of a computing device is sufficient for a plurality of ECUs in the passive service mode.

The power consumption of an ECU in the passive service mode is significantly lower than the allowed power consumption of an ECU 110, 120 in the active service mode.

When the computing device wants to communicate with one of the ECUs it wakes this unit up by sending a specific wake up communication signal or digital signal pattern via the data connection 32.

The wake up communication signal or digital signal pattern comprises an ID of the ECU with which the computing device wants to communicate.

When the ECUs are in the passive service mode, they all listen for digital communication commands or digital signals on the data connection.

All ECUs may receive a wake up communication signal sent from the computing device, and the ECU for which the ID is present in the wake up command will switch to the active service mode.

The ECU(s) which is/are not selected in the wake-up communication signal remain in the passive service mode 201.

Thereby, only one ECU is powered up at a time, and the overall power consumption of the control system it 100 is minimized.

The ECU that is in the active service mode is ready to communicate with the computing device. Transfer of data in both directions is then made possible. The computing device may then perform diagnostics of the ECU, download new software etc.

When the computing device wants to talk to another ECU it first sends a sleep command/signal via the data connection 32. All ECUs will receive the sleep command/signal, and the ECU which is in the active service mode will switch to the passive service mode. ECUs which are already in the passive service mode will remain in the passive service mode. All ECUs may receive a wake up communication signal sent from the computing device, and the ECU for which the ID is present in the wake up command will switch to the active service mode. When all ECUs are in the passive service mode, the computing device may transmit a wake up communication signal to the ECUs, comprising an ID of any of the ECUs.

Figure 3:
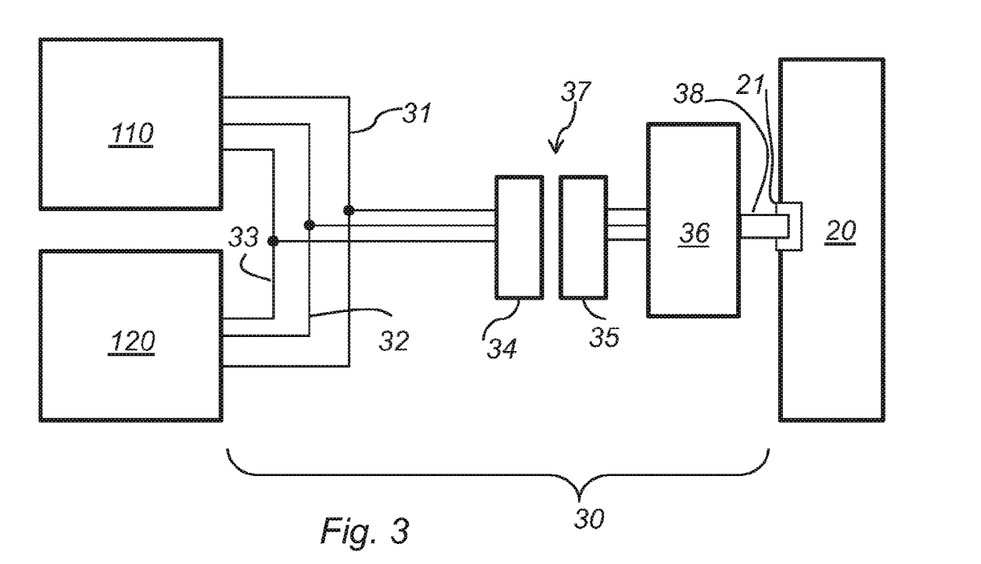
FIG. 3 is a schematic view of the arrangement of FIG. 2, in a disconnected state.

In FIG. 3, the power tool connector part 34 is separated from the service tool connector part 35, such that the connecting unit is no longer interconnecting the control system and the computing device.

In the embodiment shown in FIG. 4, the control system 100 comprises three ECUs. It is to be understood that the number of ECUs of a control system according to embodiments herein is variable.

Figure 5:
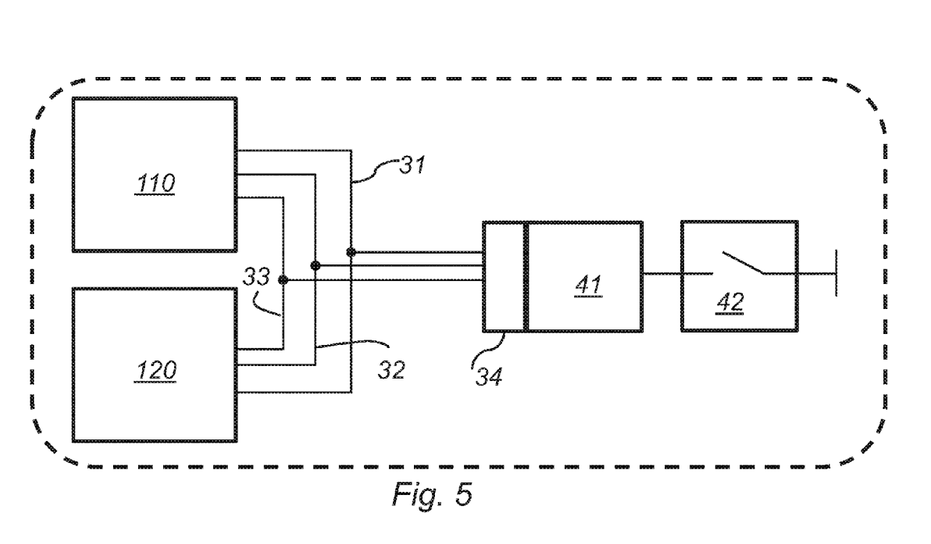
FIG. 5 is a schematic view according to FIG. 2, showing how a control system according to embodiments herein may be connected to a stop button of the power tool during in an operating mode of the power tool.

FIG. 5 illustrates how a stop button connector 41 of the power tool may be connected to the control system 100, or more specifically to the power tool connector part 34, when the computing device 20 is not connected to the control system 100. In this way, the power tool connector part 34 is protected by the stop button connector 41 when the power tool 10 is in an operating mode, by being physically connected to the stop button connector 41. Accordingly, the risk of dirt and moisture entering the power tool connector part 34 is reduced, as compared to an arrangement in which the power tool connector part 34 is left unsheltered when the power tool 10 is in the operating mode and the computing device 20 is not connected to the control system 100. The stop button connector 41 may be connected to a stop button switch 42, such that when the power tool connector part 34 and the stop button connector 41 are connected, a connection through a cable arrangement is formed between the at least one ECU 110, 120 and the stop button switch 42. The cable arrangement may include the power tool connector part 34, the stop button connector 41 as well as the data connection 32, the ground connection 33 and the power supply connection 31. An ECU 110, 120 may be configured to read switching of the stop button switch 42 through said cable arrangement, preferably switching may be read using the data connection 32 of the cable arrangement. Preferably, the stop button switch 42 is connected to the at least one ECU 110, 120 via the data connection 32 and via the ground connection 33.

Figure 6:
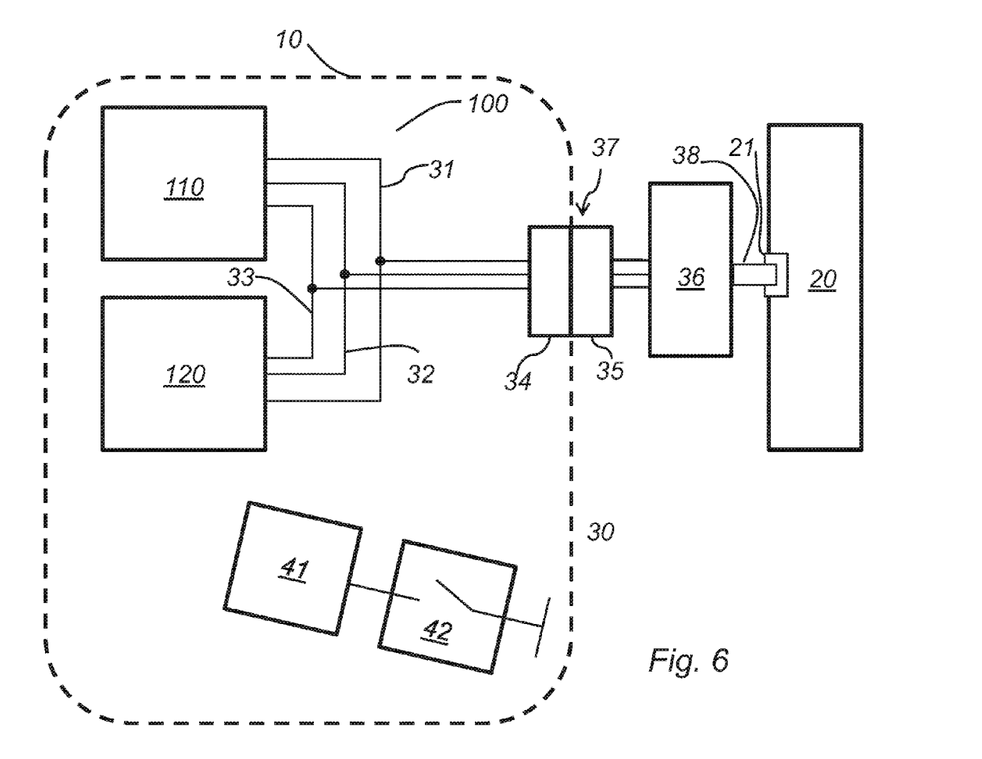
FIG. 6 is a schematic view according to FIG. 5, showing the power tool with a stop button and the computing device, when the power tool and the computing device are interconnected.
Figure 7:
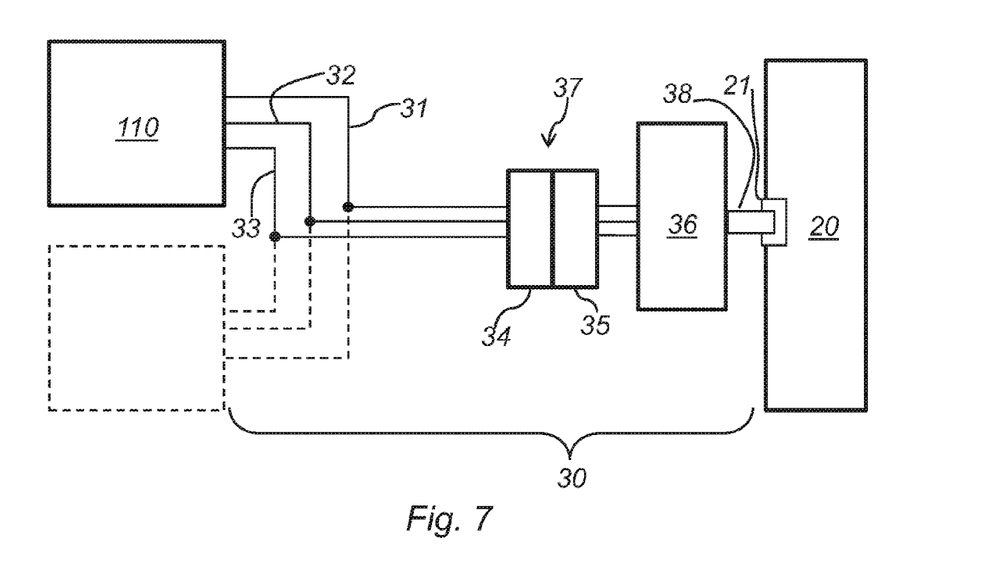
FIG. 7 is a schematic view according to FIG. 1, showing an alternative control system configuration.

FIG. 6 illustrates how the stop button switch 42 may be disconnected from the control system 100 when the computing device 20 is connected to the control system 100. Of course, with such configuration it is not possible to read switching of the stop button switch 42.

The power tool preferably comprises the driving means, such as an internal combustion engine, for driving a tool of said power tool, the ECU 110, 120, for controlling the driving means, the stop button switch 42 for stopping said driving means, the cable arrangement for connecting the stop button switch 42 and the ECU 110, 120. The cable arrangement in turn comprises the power tool connector 34 and the stop button connector 41 which are configured to mate with each other, and when the connectors 34, 41 being connected the stop button switch 42 is connected to the ECU 110, 120, and when disconnected the stop button switch 42 is disconnected from the ECU 110, 120. Further, the power tool connector 34 is connectable with the service tool connector 35 of the service tool assembly when disconnected from the stop button connector 41 so as to enable data communication between the ECU 110, 120 and a computing device 20 of the service tool assembly.

The ECU 110, 120 is connected to a common bus of the control system 100 of the power tool, and the ECU 110, 120 has a passive service mode 201 and an active service mode 202, wherein the allowed power consumption is significantly lower in the passive service mode 201 than in the active service mode 202.

Moreover, the ECU 110, 120 is operable of receiving a wake-up communication signal from the computing device when the power tool connector 34 is connected to the service tool connector 35 and when the ECU 110, 120 is in the passive service mode 201, which wake-up communication signal comprises an ID of a selected ECU 110, 120. The selected ECU 110, 120 is operable to switch from the passive service mode 201 to the active service mode 202 as a response to detecting its ID in the wake-up communication signal, so as to allow communication of data between the selected ECU 110, 120 and the computing device 20.

The ECU 110, 120 has the transitional start-up mode 200 and the ECU 110, 120 is switchable from the transitional startup mode 200 to the passive service mode 201 upon receiving the passive service mode initiating signal from the computing device 20.

The ECU 110, 120 is configured to detect connecting of the power tool connector 34 to the service tool assembly, and the ECU 110, 120 is configured not to permit running of the driving means when the power tool connector 34 is connected to the service tool assembly. More specifically, the ECU 110, 120 is configured to detect connecting of the power tool connector 34 to the service tool assembly on receiving said passive service mode initiating signal from the computing device 20, and the ECU 110, 120 is configured not to permit running of the driving means in response to receiving said signal.

Further, the ECU 110, 120 has an operating mode 203, and the ECU 110, 120 is configured to switch from the transitional start-up mode 200 to the operating mode 203 in the absence of the passive service mode initiating signal.

Preferably, the power tool lacks an internal power supply when the power tool is in the non-operating mode.

The power tool and the service tool assembly may form a power tool and service tool assembly system for communicating data between the control system 100 of the power tool and the computing device 20 of the service tool assembly.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. An arrangement for communicating data between a control system of a power tool and a computing device, the arrangement comprising:
   a control system of the power tool, the control system comprising at least one electronic control unit, ECU,
   a computing device provided externally of the power tool,
   a connecting unit interconnecting the computing device and the control system, the connecting unit comprising a data connection,
   wherein the at least one ECU has a passive service mode and an active service mode,
   wherein an allowed power consumption is significantly lower in the passive service mode than in the active service mode,
   wherein the computing device is operable to transmit a wake-up communication signal to the at least one ECU when the at least one ECU is in the passive service mode, the wake-up communication signal comprising an ID of a selected ECU out of the at least one ECU,
   wherein the selected ECU is operable to switch from the passive service mode to the active service mode as a response to detecting its ID in the wake-up communication signal, so as to allow communication of data between the selected ECU and the computing device via the data connection,
   wherein the at least one ECU enters a transitional start-up mode in response to detection of a voltage supply and wherein the computing device is operable to trigger each of the at least one ECU to switch from the transitional start-up mode to the passive service mode by transmitting a passive service mode initiating signal via the data connection.

2. An arrangement according to claim 1, wherein the power tool lacks an internal power supply when the power tool is in a non-operating mode.

3. An arrangement according to claim 1, wherein the connecting unit comprises a voltage supply connection, and wherein the computing device is operable to supply power to the at least one ECU via the voltage supply connection when the power tool is in a non-operating mode.

4. An arrangement according to claim 1, wherein each of the at least one ECU has an operating mode, and wherein each of the at least one ECU is configured to switch from the transitional start-up mode to the operating mode in the absence of the passive service mode initiating signal.

5. The arrangement according to claim 1, wherein the data connection is a single wire connection.

6. An arrangement according to claim 1, wherein the power tool is provided with an internal combustion engine.

7. An arrangement according to claim 1, wherein one of the at least one ECU is an electronic carburetor control system.

8. The arrangement according to claim 1, wherein one of the at least one ECU is a combustion engine ignition control unit.

9. A method for communicating data between a control system of a power tool and a computing device provided externally of the power tool, wherein the power tool is provided with an internal combustion engine and wherein the power tool lacks internal power supply when the combustion engine is in a non-operating mode, wherein the control system comprises at least one electronic control unit, ECU, wherein the at least one ECU has a passive service mode and an active service mode, wherein an allowed power consumption is significantly lower in the passive service mode than in the active service mode, the method comprising:
   transmitting a wake-up communication signal from the computing device to the at least one ECU when each of the at least one ECUs is in the passive service mode, wherein the wake-up communication signal comprises an ID of a selected ECU out of the at least one ECU,
   in the selected ECU, switching to the active service mode in response to detection of the ID in the wake-up communication signal, and communicating data between the selected ECU and the computing device,
   wherein each of the at least one ECU has a transitional start-up mode the method further comprising:
   interconnecting the computing device and the control system via a connecting unit comprising a voltage supply connection and a data connection;

supplying power to the at least one ECU from the computing device, for the at least one ECU, entering the transitional start-up mode in response to detection of a voltage supply, transmitting a passive service mode initiating signal from the computing device to the at least one ECU, in the at least one ECU, entering the passive service mode, in response to receiving the passive service mode initiating signal.

10. A method according to claim 9, wherein the power tool has a stop button switch for stopping the internal combustion engine and a cable arrangement for connecting the stop button switch and the at least one ECU, wherein the cable arrangement includes a stop button connector and a power tool connector, and wherein the method comprising the initial steps of disconnecting the power tool connector from the stop button connector, and connecting the power tool connector to a service tool connector of a service tool assembly.

11. A method according to claim 9, wherein each of the at least one ECU has an operating mode, the method furthermore comprising:

in the at least one ECU switching from the transitional start-up mode to the operating mode in the absence of passive service mode initiating signal.

* * * * *